(12) United States Patent
Nakamori et al.

(10) Patent No.: US 9,023,534 B2
(45) Date of Patent: May 5, 2015

(54) POLYAMIDE IMIDE FIBER, NON-WOVEN FABRIC COMPOSED OF THE FIBER, PROCESS FOR MANUFACTURE OF THE NON-WOVEN FABRIC, AND SEPARATOR FOR ELECTRONIC COMPONENT

(75) Inventors: Masahiko Nakamori, Shiga (JP); Yasuo Ohta, Shiga (JP); Hisato Kobayashi, Shiga (JP); Syoji Oda, Shiga (JP); Nobuyuki Taniguchi, Shiga (JP); Daisuke Sakura, Shiga (JP); Katsuya Shimeno, Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 828 days.

(21) Appl. No.: 11/997,049

(22) PCT Filed: Jul. 27, 2006

(86) PCT No.: PCT/JP2006/314873
§ 371 (c)(1),
(2), (4) Date: Jan. 28, 2008

(87) PCT Pub. No.: WO2007/013552
PCT Pub. Date: Feb. 1, 2007

(65) Prior Publication Data
US 2010/0151333 A1    Jun. 17, 2010

(30) Foreign Application Priority Data

Jul. 29, 2005 (JP) .................................. 2005-221067
Jul. 29, 2005 (JP) .................................. 2005-221068

(51) Int. Cl.
| H01M 2/16 | (2006.01) |
| D04H 1/00 | (2006.01) |
| D01F 6/78 | (2006.01) |
| B01D 71/64 | (2006.01) |
| D01D 5/00 | (2006.01) |
| D04H 1/42 | (2012.01) |
| D04H 3/02 | (2006.01) |
| H01G 9/02 | (2006.01) |
| H01G 11/52 | (2013.01) |
| H01G 9/00 | (2006.01) |
| H01M 8/06 | (2006.01) |

(52) U.S. Cl.
CPC ...... *D01F 6/78* (2013.01); *B01D 71/64* (2013.01); *D01D 5/0038* (2013.01); *D04H 1/42* (2013.01); *D04H 3/02* (2013.01); *H01G 9/02* (2013.01); *H01G 9/155* (2013.01); *H01M 2/162* (2013.01); *H01M 8/0687* (2013.01); *H01G 11/52* (2013.01); *Y02E 60/13* (2013.01); *B01D 2323/39* (2013.01)

(58) Field of Classification Search
USPC ............ 429/247, 249, 221; 428/221; 442/327
See application file for complete search history.

(56) References Cited

U.S. PATENT DOCUMENTS

| 4,060,451 | A  | * | 11/1977 | Uchiyama et al. ......... 162/157.3 |
| 4,741,979 | A  |   | 5/1988  | Faust et al. |
| 5,521,276 | A  | * | 5/1996  | Choi et al. ................... 528/322 |
| 6,265,333 | B1 | * | 7/2001  | Dzenis et al. ................ 442/346 |
| 7,279,251 | B1 | * | 10/2007 | Yun et al. ..................... 429/247 |
| 2002/0100725 | A1 |   | 8/2002  | Lee et al. |
| 2002/0160211 | A1 | * | 10/2002 | Kurita et al. ................. 428/458 |
| 2005/0053840 | A1 |   | 3/2005  | Jo et al. |
| 2008/0241538 | A1 |   | 10/2008 | Lee et al. |
| 2009/0117380 | A1 |   | 5/2009  | Lee et al. |
| 2010/0021732 | A1 |   | 1/2010  | Lee et al. |

FOREIGN PATENT DOCUMENTS

| JP | 48-1466    | 1/1973  |
| JP | S48-1466 B | 1/1973  |
| JP | 60-000052  | 1/1985  |
| JP | 08-218223  | 8/1986  |
| JP | 61-232560  | 10/1986 |
| JP | 62-283553  | 12/1987 |
| JP | 63-145465  | 6/1988  |
| JP | 1-258358   | 10/1989 |
| JP | 02-269738  | 11/1990 |
| JP | 03-297120  | 12/1991 |
| JP | 05-222612  | 8/1993  |
| JP | 07-42611   | 5/1995  |
| JP | 09-52308   | 2/1997  |

(Continued)

OTHER PUBLICATIONS

Choi et al., "Electrospun PVDF nanofiber web as polymer electrolyte or separator", Electrochimica Acta, Elsevier Science Publishers, Barkin GB, 50(2-3):339-343 (2004).
Kim et al., "Supercapacitor performances of activated carbon fiber webs prepared by electrospinning of PMDA-ODA poly(amic acid) solutions", Electrochimica Acta, Elsevier Science Publishers, Barkin GB, 50(2-3):883-887 (2004).
Dictionary of Chemistry and Chemical Technology, Editorial Committee, Chemical Industry Press, p. 1280 (Jan. 2003).
Communication from the State Intellectual Property Office of the People's Republic of China in connection with Chinese Patent Application No. 200680026932.7, pp. 1-6 (dated Dec. 9, 2010).

(Continued)

*Primary Examiner* — Patrick Ryan
*Assistant Examiner* — Julian Anthony
(74) *Attorney, Agent, or Firm* — Fish & Richardson P.C.

(57) ABSTRACT

The present invention provides a fiber having a nano-order fiber diameter, which is produced by without a process of dehydration and cyclization by a heat treatment after fiber spinning and has excellent heat resistance and mechanical strength, and a non-woven fabric composed of the fiber, and discloses the polyamide-imide fiber and the non-woven fabric having an average fiber diameter of from 0.001 μm to 1 μm and also discloses the process for producing threrof. The present invention also provides a separator for an electronic component which has a high conductivity and a small separator thickness and is improved in safety during reflow soldering or short-circuiting, and discloses the separator composed of a non-woven fabric obtained by an electro-spinning method.

32 Claims, 1 Drawing Sheet

(56) References Cited

FOREIGN PATENT DOCUMENTS

| | | |
|---|---|---|
| JP | 2000-331663 | 11/2000 |
| JP | 2002-249966 | 9/2002 |
| JP | 2004-308031 | 11/2004 |
| JP | 2005-019026 | 1/2005 |
| JP | 2006-229092 | 8/2006 |
| KR | 10-0128814 | 7/1998 |
| WO | WO 01/89022 | 11/2001 |
| WO | 2005/123995 | 12/2005 |
| WO | 2006/123879 | 11/2006 |

OTHER PUBLICATIONS

Latest Technologies of Functional Non-Woven Fabric, 1$^{st}$ ed. (1997) CMC Publishing Co., Ltd.
Official communication from the State Intellectual Property Office of the People's Republic of China in Application No. 200680026932.7 (dated Apr. 19, 2011).
Office Action issued in Korean Application No. 10-2008-7004381 on Jan. 23, 2013 with its English translation.
European Patent Office Communication issued in EP Application No. 06 781 784.1-1303 on Sep. 18, 2013.

* cited by examiner

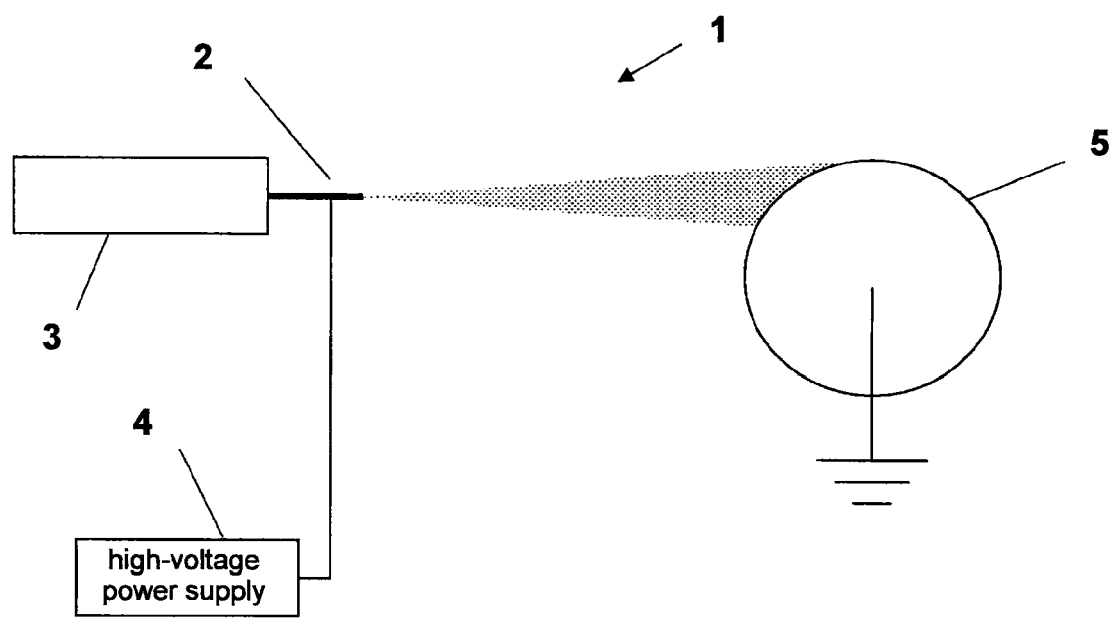

POLYAMIDE IMIDE FIBER, NON-WOVEN FABRIC COMPOSED OF THE FIBER, PROCESS FOR MANUFACTURE OF THE NON-WOVEN FABRIC, AND SEPARATOR FOR ELECTRONIC COMPONENT

TECHNICAL FIELD

The present invention relates to a polyamide-imide fiber, a non-woven fabric composed of the fiber, a process for producing thereof, and a separator for an electronic component composed of the non-woven fabric. The present invention particularly relates to a nano-order polyamide-imide fiber which is suitable for use in a filter, a separating membrane for an electrolytic battery, a separator for a secondary battery, component dialysis membrane for a fuel cell, a lining material of medical artificial organs and a carrier for cell cultures or bio-reactors, to a non-woven fabric composed of the fiber, to a process for producing the fiber and the non-woven fabric and to a separator suitable for use in an electrolyte battery, a secondary battery, a fuel cell and a capacitor.

BACKGROUND ART

An aramide fiber and a polyimide fiber have been conventionally used primarily as a raw material in, for example, aerospace fields and electric fields due to the excellent heat resistance of these fibers. Specific examples of these fibers typically include a para-aramide fiber synthesized from terephthalic acid chloride and p-phenylenediamine, and a meta-aramide fiber synthesized from isophthalic acid chloride and m-phenylenediamine. However, these are produced by a so-called wet spinning method, in which a polymer is dissolved in an acidic solvent or the like, and the dissolved polymer is spun, extracted and then solidified. In this method, special equipments for solvent recovery, pollution prevention, or the like are required, and operations are very complicated.

Also, with regard to a polyimide fiber, a polyimide fiber for use in, for example, aerospace fields or electronic material fields (for example, JP-B-7-42611) and a polyimide non-woven fabric used as a heat resistant bag filter (for example, JP-A-9-52308) has been proposed. However, it is necessary that polyamide acid, an intermediate polymer, is heated to high temperature to be dehydrated and cyclized after fiber spinning and drawing of polyamide acid, there is a problem of not only high production cost but also strength reduction of a fiber due to voids generated after heating. Because of this problem, it is difficult to obtain a practicable nano-order polyimide fiber having high strength and heat resistance.

In batteries and capacitors, a separator is generally laminated between an anode electrode and a cathode electrode. The separator is one of important constituent materials to prevent a short circuit caused by contact of both electrodes. A porous separator is required so as to be provided with ionic conductivity. The separator is used in the form of a non-woven fabric, paper, film, membrane or the like made of such materials as natural fibers, synthetic fibers, glass fibers, synthetic resins or the like, according to each specification of various batteries and capacitors.

A non-woven fabric separator used in electronic components such as batteries and capacitors is produced by a dry production method in which an opened fiber aggregation is uniformly dispersed by a carding machine and the dispersed fibers are combined by thermal bonding or using a binder, or by a wet production method in which fibers as raw material are uniformly dispersed in water to form a paper by a paper machine (refer to, for example, "Latest Technologies of Functional Non-Woven Fabric (CMC Publishing Co., Ltd.), Chapter 14, JP-A-60-52, JP-A-61-232560, JP-A-62-283553 and JP-A-1-258358). However, the non-woven fabric produced by these methods is composed of fibers having a fiber diameter in the range of from several µm to tens of µm, and is therefore unsatisfactory for batteries having high energy density and high electromotive force which are currently desired. Also, because of a large fiber diameter, the obtained non-woven fabric is increased in pore diameter, which enhances the possibility of the occurrence of short circuit between electrodes. If the separator thickness is increased to prevent the occurrence of short circuit, it is difficult to coil the separator and obtain a small-sized and light-weight battery.

With regard to a separator using cellulose fibers of natural fibers as a main component, a non-woven fabric-like sheet is produced by papermaking cellulose fibers and then drying it under heating to remove water. However, it is difficult to improve electric conductivity because voids between fibers are decreased by the influence of surface tension of water when water is removed. In order to solve this problem, dissolving and removing a substance contained in the separator is conducted after the separator is formed, but the process is complicated, resulting in low productivity (for example, JP-A-2000-331663).

A separator of a porous film is produced by a drawing method using polyethylene or polypropylene as a raw material and a method in which an inorganic material is added, and the washing and dissolving using a detergent are conducted. However, the process is complicated and has insufficient safety during reflow soldering or short-circuiting because melting points of polyethylene and polypropylene are about 120° C. and 170° C., respectively.

DISCLOSURE OF THE INVENTION

It is an object of the present invention to provide a fiber having a nano-order fiber diameter, which is produced by without a process of dehydration and cyclization by a heat treatment after fiber spinning and has excellent heat resistance and mechanical strength, and a non-woven fabric composed of the fiber. In addition, the object of the present invention is to provide a separator for use in an electronic component which has a high conductivity and a small separator thickness and improved in safety during reflow soldering or short-circuiting.

The inventors of the present invention have made earnest studies to solve the above problems, and as a result, the present invention has been completed. Accordingly, the present invention relates to:

(1) A polyamide-imide fiber having an average fiber diameter in the range of from 0.001 µm to 1 µm;

(2) The polyamide-imide fiber according to the above (1), wherein the polyamide-imide fiber consists of polyamide-imide having inherent viscosity of 0.2 dl/g or more;

(3) The polyamide-imide fiber according to the above (1) or (2), wherein polyamide-imide has at least a structure represented by a formula (I);

(4) A non-woven fabric composed of the polyamide-imide fiber according to any one of the above (1) to (3);

(5) A process for producing the non-woven fabric of the above (4), comprising preparing a solution containing polyamide-imide and an organic solvent, spinning a fiber from the obtained solution by an electro-spinning method, and collecting the polyamide-imide fiber on a collecting substrate;

(6) A separator for use in an electronic component, comprising a non-woven fabric obtained by an electro-spinning method;

(7) The separator for use in an electronic component according to the above (6), comprising a non-woven fabric composed of a fiber having an average fiber diameter in the range of from 0.001 μm to 1 μm;

(8) The separator for use in an electronic component according to the above (6) or (7), wherein air permeability is in the range of from 1 sec/100 cc Air to 2000 sec/100 cc Air;

(9) The separator for use in an electronic component according to any one of the above (6) to (8), wherein the fiber composing the non-woven fabric contains polyamide-imide as a main component;

(10) The separator for use in an electronic component according to the above (9), wherein the separator consists of polyamide-imide having inherent viscosity of 0.2 dl/g or more;

(11) The separator for use in an electronic component according to the above (9) or (10), wherein the polyamide-imide has at least a structure represented by the formula (I); and

(12) The separator according to the above (6) to (11), wherein the electronic component is a battery or a capacitor.

[Chemical formula 1]

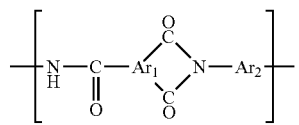

Formula (I)

In the formula (I), $Ar_1$ represents a trivalent residue other than three carboxy groups of a tricarboxylic acid and $Ar_2$ represents a divalent residue other than two amino groups of a diamine compound.

The use of polyamide-imide makes it possible to obtain a fiber which has a nano-order fiber diameter, is produced by without a process of dehydration and cyclization by a heat treatment after fiber spinning, and has excellent heat resistance and mechanical strength, and to obtain a non-woven fabric composed of the fiber. In addition, this makes it possible to obtain a separator for use in an electronic component which has a high conductivity and a small separator thickness and is improved in safety during reflow soldering or short-circuiting.

BRIEF DESCRIPTION OF THE DRAWING

FIG. 1 is a typical sectional view of an electro-spinning equipment.

BEST MODE FOR CARRYING OUT THE INVENTION

The present invention is hereinafter described in detail.

The polyamide-imide fiber of the present invention preferably has an average fiber diameter in the range of from 0.001 μm to 1 μm.

This is because industrial applicability such as a substitution of a filter with low pressure loss and thin film is significantly expanded when the average fiber diameter is in the range of from 0.001 μm to 1 μm. When the average fiber diameter is less than 0.001 μm, it is difficult to produce the fiber and the fiber comes to have properties equivalent to a film, whereas when the average fiber diameter exceeds 1 μm, only the effect equivalent to a conventional non-woven fabric is obtained. The average fiber diameter is preferably in the range of from 0.01 μm to 0.9 μm and more preferably in the range of from 0.05 μm to 0.5 μm.

The inventors of the present invention have found that voids generated during a high-temperature heat treatment after fiber spinning and drawing influences seriously the strength of a nano-order fiber in producing a polyimide fiber. Then, the inventors have made earnest studies concerning the prevention of the voids generation, and as a result, found that the above-mentioned problem is solved if polyamide-imide is used because polyamide-imide is cyclized during polymerization, and therefore, a nano-order fiber is obtained without any adverse influence on the strength. Moreover, polyamide-imide has a high glass transition temperature and therefore has heat resistance.

Though polyamide-imide used in the polyamide-imide fiber and the non-woven fabric of the present invention may be synthesized by a usual method such as an acid chloride method using trimellitic acid chloride and diamine or a diisocyanate method using trimellitic acid anhydride and diisocyanate, the diisocyanate method is preferably used in the aspect of production costs.

The structure of polyamide-imide used in the polyamide-imide fiber and the non-woven fabric of the present invention preferably contains at least the structure represented by the formula (I) from the standpoint of polymerization property and solubility of the obtained polymer.

[Chemical formula 2]

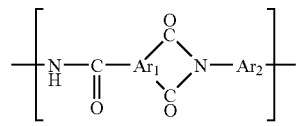

Formula (I)

Though an acid component, which is a precursor for the synthesis of polyamide-imide used in the polyamide-imide fiber and the non-woven fabric of the present invention, is trimellitic acid anhydride or trimellitic acid chloride, a part of these acid components may be replaced with other polybasic acids or anhydrides thereof. Examples of these polybasic acids and anhydrides thereof include tetracarboxylic acids such as pyromellitic acid, biphenyltetracarboxylic acid, biphenylsulfone tetracarboxylic acid, benzophenone tetracarboxylic acid, biphenyl ether tetracarboxylic acid, ethylene glycol bistrimellitate and propylene glycol bistrimellitate, and anhydrides thereof; aliphatic dicarboxylic acids such as oxalic acid, adipic acid, malonic acid, sebacic acid, azelaic acid, dodecanedicarboxylic acid, dicarboxypolybutadiene, dicarboxypoly(acrylonitrile-butadiene) and dicarboxypoly(styrene-butadiene); alicyclic dicarboxylic acids such as 1,4-cyclohexanedicarboxylic acid, 1,3-cyclohexanedicarboxylic acid, 4,4'-dicyclohexylmethanedicarboxylic acid and dimer acid; and aromatic dicarboxylic acids such as terephthalic acid, isophthalic acid, diphenyl sulfonedicarboxylic acid, diphenyl ether dicarboxylic acid and naphthalenedicarboxylic acid.

Also, a part of the trimellitic acid compound may be replaced with glycols. Examples of the glycols include alkylene glycols such as ethylene glycol, propylene glycol, tetramethylene glycol, neopentyl glycol and hexane diol; polyalkylene glycols such as polyethylene glycol, polypropylene glycol and polytetramethylene glycol; and polyesters which have a terminal hydroxyl group and are synthesized from one or more of the dicarboxylic acids and one or more of the glycols.

Examples of diamine (diisocyanate) components which is a precursor for the synthesis of polyamide-imide used in the polyamide-imide fiber and the non-woven fabric of the present invention include aliphatic diamines such as ethylenediamine, propylenediamine and hexamethylenediamine, and diisocyanates of these compounds; alicyclic diamines such as 1,4-cyclohexanediamine, 1,3-cyclohexanediamine, isophorone diamine and 4,4'-dicyclohexylmethanediamine, and diisocyanates of these compounds; aromatic diamines such as m-phenylenediamine, p-phenylenediamine, 4,4'-diaminodiphenylmethane, 4,4'-diaminodiphenyl ether, 4,4'-diaminodiphenylsulfone, benzidine, o-tolidine, 2,4-tolylenediamine, 2,6-tolylenediamine and xylylenediamine, and diisocyanates of these compounds, and the like. Among these compounds, 4,4'-diaminodiphenylmethane, o-tolidine and diisocyanates of these compounds are preferable in the aspect of reactivity and costs.

Examples of solvents used for the polymerization of polyamide-imide used in the polyamide-imide fiber and the non-woven fabric of the present invention include organic amide polar solvents such as N,N'-dimethylformamide, N,N'-dimethylacetamide, N-methyl-2-pyrrolidone, γ-butyrolactone, N-methylcaprolactam; water-soluble ether compounds such as tetrahydrofuran and dioxane; water-soluble ketone compounds such as acetone and methyl ethyl ketone; water-soluble nitrile compounds such as acetonitrile and propionitrile, and the like. These solvents may be used as a mixture of two or more solvents, and are not restricted particularly.

To obtain polyamide-imide used in the polyamide-imide fiber and the non-woven fabric of the present invention, a molar ratio of the used amount of the diamine (diisocyanate) component to the used amount of the acid component in the organic solvent is preferably in the range of from 0.90 to 1.20 and more preferably in the range of from 0.95 to 1.05.

Inherent viscosity of polyamide-imide used in the polyamide-imide fiber and the non-woven fabric of the present invention preferably exceeds 0.2 dl/g. Though the inherent viscosity is dependent on the molar ratio of the amount of the diamine (diisocyanate) component to the used amount of the acid component, time and temperature for the polymerization, it can exceed 0.2 dl/g by configuring these conditions appropriately. For example, in the case where the molar ratio of the used amount of the diamine (diisocyanate) component to the used amount of the acid component is in the range of from 0.90 to 1.20, the inherent viscosity can be made to exceed 0.2 dl/g by configuring the time for the polymerization to from 10 minutes to 30 hours and the polymerization temperature to the range of from 70° C. to 160° C. When the inherent viscosity is 0.2 dl/g or less, the mechanical strength of the nano-order fiber is insufficient, and it is difficult to form a continuous fiber by an electro-spinning method.

The polymerization of polyamide-imide used in the polyamide-imide fiber and the non-woven fabric of the present invention may proceed easily by stirring while heating at the range of from 60° C. to 200° C. in the polar solvent under an inert gas atmosphere.

In producing polyamide-imide used in the polyamide-imide fiber and the non-woven fabric of the present invention, amines such as triethylamine, diethylenetriamine and 1,8-diazabicyclo[5,4,0]-7-undecene (DBU) and alkali metal salts such as sodium fluoride, potassium fluoride, cesium fluoride and sodium methoxide may be used as a catalyst as need.

A solid concentration of a polyamide-imide solution is preferably in the range of from 0.1% by weight to 30% by weight, and more preferably in the range of from 1% by weight to 25% by weight.

In producing polyamide-imide used in the polyamide-imide fiber and the non-woven fabric of the present invention, additives such as an inorganic or organic filler may be compounded to improve various properties of the non-woven fabric obtained by fiber spinning. When the additive has a low affinity to polyamide-imide, the size of the additive is preferably smaller than that of the polyamide-imide fiber to be obtained. If the size of the additive is larger, the additive precipitates during electro-spinning, which causes a thread breakage. Examples of the method for compounding the additive include the method that a necessary amount of the additive is added in advance in a reaction system of the polyamide-imide polymerization and the method that a necessary amount of the additive is added after the polyamide-imide polymerization reaction is completed. When the additive does not inhibit the polymerization, the former method is preferable because a non-woven fabric in which the additive is uniformly dispersed is obtained. In the case of the method that a necessary amount of the additive is added after the polyamide-imide polymerization reaction is completed, stirring by ultrasonic wave or a mechanical means such as a homogenizer is carried out.

The polyamide-imide non-woven fabric of the present invention is formed of fibers having an average fiber diameter in the range of from 0.001 μm to 1 μm. When the average fiber diameter is less than 0.001 μm, it is unfavorable because of poor self-support property. When the average fiber diameter exceeds 1 μm, it is unfavorable because of less surface area of the non-woven fabric. The average fiber diameter is more preferably in the range of from 0.005 μm to 0.5 μm and particularly preferably in the range of from 0.01 μm to 0.2 μm.

The process for producing the polyamide-imide non-woven fabric of the present invention is not particularly restricted as long as it is the method that a fiber having a fiber diameter in the range of from 0.001 μm to 1 μm is obtained, however, an electro-spinning method is preferable. Hereinafter, a producing process by the electro-spinning method is described.

The electro-spinning method used for producing the polyamide-imide fiber and the non-woven fabric of the present invention is one type of solution spinning method. In the electro-spinning method, it is general that a fiber is formed during a process where a polymer solution of high plus voltage applied is sprayed to the surface of an earthed or negatively charged electrode. An example of an electro-spinning equipment is shown in FIG. 1. In the figure, the electro-spinning equipment 1 is provided with a spinning nozzle 2 that discharges a polymer, a raw material of the fiber, and a counter electrode 5 facing to the spinning nozzle 2. This counter electrode 5 is earthed. The polymer solution which is charged by application of high voltage is discharged from the spinning nozzle 2 towards the counter electrode 5, during which a fiber is formed. A polyamide-imide solution prepared by dissolving polyamide-imide in an organic solvent is discharged in an electrostatic field formed between electrodes, and the solution is drawn towards the counter electrode to accumulate the formed fibrous substance on a collecting substrate, whereby a non-woven fabric can be obtained. Here, the term non-woven fabric includes not only a non-woven fabric in which the solvent in the solution has been already removed, but also a non-woven fabric containing the solvent of the solution.

In the case of the non-woven fabric containing the solvent, the solvent is removed after the electro-spinning. Examples of the method for removing the solvent include the method that the non-woven fabric is immersed in a poor solvent to extract the solvent and the method that the residual solvent is vaporized by a heat treatment.

A material of a solution vessel 3 is not particularly restricted as long as it has resistance to the organic solvent to be used. Also, the solution in the solution vessel 3 may be discharged in the electric field by a method of mechanically extraction, pumping out or the like.

The spinning nozzle 2 has preferably an inside diameter of from about 0.1 mm to about 3 mm. When the nozzle inside diameter is in this range, a polyamide-imide fiber having an average fiber diameter in the range of from 0.001 μm to 1 μm can be obtained. A material of the nozzle may be either a metal or a nonmetal. When the nozzle is made of a metal, the nozzle may be used as one electrode. When the nozzle 2 is made of a nonmetal, an electric field may be impressed on the discharged solution by installing the electrode inside of the nozzle. A plurality of nozzles may be used considering production efficiency. In addition, though the cross-section shape of the nozzle is generally circular, a nozzle having a modified cross-section shape may be used according to the kind of polymer and a use application.

With regard to the counter electrode 5, an electrode having various shapes such as a roll-like electrode as shown in FIG. 1, or plate-like or belt-like metallic electrode may be used according to a use application.

Though the case that the counter electrode 5 serves as the substrate to collect fibers is explained in the above description, a substance that serves as the collecting substrate may be installed between the spinning nozzle 2 and the counter electrode 5 to collect polyamide-imide fibers thereon. In this case, for example, a belt substrate is installed between the spinning nozzle 2 and the counter electrode 5, thereby enabling continuous production.

Though the electrodes are generally formed in pairs, an additional electrode may be introduced. Fibers are spun by the pair of electrodes, and further, the introduced electrode of different electric potential is used to control the state of the electric field, thereby controlling the condition of the fiber spinning.

A high-voltage power supply 4 is not restricted particularly, and a direct-current high-voltage generator may be used and also a Van de Graaff electrostatic generator may be used. Though the applied voltage is not limited particularly, the voltage is generally in the range of from 3 kV to 100 kV, preferably in the range of from 5 kV to 50 kV and more preferably in the range of from 5 kV to 30 kV. The polarity of the applied voltage may be either positive or negative.

The distance between the electrodes is dependent on, for example, the applied voltage, the size of the nozzle, the discharging amount of the spinning solution, the solid concentration of the spinning solution, and the like. In producing the polyamide-imide fiber and the non-woven fabric of the present invention, the distance between the electrodes is appropriately in the range of from 5 cm to 20 cm. When the distance between the electrodes is in this range, a polyamide-imide fiber having an average fiber diameter in the range of from 0.001 μm to 1 μm can be obtained.

Next, the process for producing the polyamide-imide fiber and the non-woven fabric of the present invention by the electro-spinning method is described in detail. First, a solution in which polyamide-imide is dissolved in an organic solvent is produced. A solid concentration of polyamide-imide in the solution used in the process for producing the polyamide-imide fiber and the non-woven fabric of the present invention is preferably in the range of from 0.1% by weight to 30% by weight. When the solid concentration of polyamide-imide is in this range, a polyimide-imide fiber having an average fiber diameter in the range of from 0.001 μm to 1 μm can be obtained. When the solid concentration of polyamide-imide is less than 0.1% by weight, it is unfavorable because the concentration is so low that it is difficult to form the polyamide-imide fiber and the non-woven fabric. When the solid concentration exceeds 30% by weight, it is unfavorable because the fiber diameters of the obtained polyamide-imide fiber and non-woven fabric are increased. The solid concentration of polyimide-imide is more preferably in the range of from 1% by weight to 20% by weight.

The organic solvent to form the polyamide-imide solution used in the polyamide-imide fiber and the non-woven fabric of the present invention is not particularly restricted as long as it can dissolve polyamide-imide in the range of the above concentration. In fiber spinning, a polymerization solution obtained by preparing polyamide-imide may be used as it is, or a solution which is obtained by precipitating polyamide-imide by using a poor solvent, washing and purifying the polyamide-imide precipitate, and then resolving the washed and purified precipitate in a good solvent may be used. In the case that the obtained polyamide-imide fiber is not impaired, it is preferable to use the polymerization solvent as it is.

Examples of the solvent to form the polyamide-imide solution used in the polyamide-imide fiber and the non-woven fabric of the present invention include hilly volatile solvents such as acetone, chloroform, ethanol, isopropanol, methanol, toluene, tetrahydrofuran, benzene, benzyl alcohol, 1,4-dioxane, propanol, carbon tetrachloride, cyclohexane, cyclohexanone, methylene chloride, phenol, pyridine, trichloroethane and acetic acid; and relatively less volatile solvents such as N,N-dimethylformamide (DMF), dimethylsulfoxide (DMSO), N,N-dimethylacetamide (DMAc), 1-methyl-2-pyrrolidone (NMP), ethylene carbonate, propylene carbonate, dimethyl carbonate, acetonitrile, N-methylmorpholine-N-oxide, butylene carbonate, γ-butyrolactone, diethyl carbonate, diethyl ether, 1,2-dimethoxyethane, 1,3-dimethyl-2-imidazolidinone, 1,3-dioxolan, ethylmethyl carbonate, methyl formate, 3-methyloxazolidin-2-one, methyl propionate, 2-methyltetrahydrofuran and sulfolane. Alternatively, the mixture of two or more of the above solvents may also be used.

With regard to an atmosphere of the fiber spinning, the fiber spinning is usually performed in air. However, the electro-spinning may be also performed in a gas, such as carbon dioxide, having a higher sparkover voltage than air, which enables spinning at a low voltage and also makes it possible to prevent abnormal electrical discharge such as a corona discharge. Also, since water is a poor solvent which scarcely solve polyamide-imide, there is the case where polyamide-imide precipitates in the proximity of the spinning nozzle. In this case, it is preferable to perform fiber spinning in air which is allowed to pass through a drying unit to reduce water content in air.

Next, the step for obtaining the polyamide-imide fiber and the non-woven fabric of the present invention is described. In the present invention, during drawing the polyamide-imide solution towards the counter electrode 5, a fibrous substance is formed by a solvent vaporization on a condition. This fibrous substance is collected on the collecting substrate which serves as the counter electrode 5 or the collecting substrate installed between the spinning nozzle 2 and the counter electrode 5. At usual room temperature, the solvent is vaporized completely before the fibrous substance is collected on the collecting substrate. In the case that the solvent is insufficiently vaporized, the fiber drawing may be performed under reduced pressure. The polyamide-imide fiber of the present invention has been formed by the time when the fibrous substance is collected on the collecting substrate at the latest. The fiber drawing temperature is usually at the range of from 0° C. to 50° C. though it depends on the state of the solvent vaporization and on the viscosity of the fiber spinning solution. Then, the polyamide-imide fibers are accumulated on the collecting substrate to thereby produce the polyamide-imide non-woven fabric of the present invention.

Though the areal weight of the polyamide-imide non-woven fabric of the present invention is determined according to its use application and is not limited particularly, it is preferably in the range of from 0.05 $g/m^2$ to 50 $g/m^2$ in an air filter application. The areal weight is measured according to JIS-L1085. When the areal weight is 0.05 $g/m^2$ or less, it is unfavorable because the collecting efficiency of the filter is lowered, whereas when the areal weight is 50 $g/m^2$ or more, it is unfavorable because an airflow resistance of the filter is too high.

Though the thickness of the polyamide-imide non-woven fabric of the present invention is determined according to its use application and is not limited particularly, it is preferably in the range of from 1 µm to 100 µm. The thickness is measured by a micrometer.

The polyamide-imide non-woven fabric of the present invention is subjected to after-treatment so as to suit to each use application if necessary. For example, calendering treatment for densification or arranging the accuracy of the thickness, hydrophilic treatment, water-repellent treatment, treatment for sticking a surfactant and washing treatment using pure water may be subjected.

The polyamide-imide non-woven fabric of the present invention may be used singly or in combination of other members according to handleability and a use application. For example, cloths (non-woven fabrics, woven fabrics and knit fabrics) that can be a support base material as the collecting substrate, metals having a film, drum, net, plate or belt form, conductive materials made of carbon or the like, and nonconductive materials made of organic polymers may be used. By forming the non-woven fabric on these members, the member that the support base material is combined with the non-woven fabric can be manufactured.

The polyamide-imide non-woven fabric of the present invention can be used in various air filter applications such as bag filters, air cleaning filters, filters for precision mechanical equipment, cabin filters for vehicles or trains, engine filters and building air conditioning filters. The polyamide-imide non-woven fabric is utilized particularly for air cleaning applications in which heat resistance, mechanical strength and dimensional stability for heating are required; the field of liquid filters such as oil filters; and electronic applications such as insulating substrates of light, small and thin electronic circuits, separating membranes for an electrolytic battery which become high temperature inside during discharge and charge, battery separators and component dialysis membranes for a fuel cell. The polyamide-imide non-woven fabric of the present invention is particularly effective in applications exposed to a high temperature circumstance. The polyamide-imide non-woven fabric is also used in various applications such as lining materials of medical artificial organs and carriers for for cell cultures or bio-reactors.

The separator for an electronic component of the present invention is preferably composed of a non-woven fabric obtained by an electro-spinning method. This is because a non-woven fabric which is well-balanced between excellent air permeability and mechanical strength, has a high conductivity, a small separator thickness, and a high heat resistance and is improved in safety during reflow soldering or short-circuiting is obtained by the electro-spinning method.

The electro-spinning method used for producing the non-woven fabric used in the separator for an electronic component of the present invention is one type of solution spinning method. In the electro-spinning method, it is general that a fiber is formed during a process where a polymer solution of high plus voltage applied is sprayed to the surface of an earthed or negatively charged electrode. An example of an electro-spinning equipment is shown in FIG. 1. In the figure, the electro-spinning equipment 1 is provided with a spinning nozzle 2 that discharges a polymer, a raw material of the fiber, and a counter electrode 5 facing to the spinning nozzle 2. This counter electrode 5 is earthed. The polymer solution which is charged by application of high voltage is discharged from the spinning nozzle 2 towards the counter electrode 5, during which a fiber is formed. A polyamide-imide solution prepared by dissolving polymer in an organic solvent is discharged in an electrostatic field formed between electrodes, and the solution is drawn towards the counter electrode to accumulate the formed fibrous substance on a collecting substrate, whereby a non-woven fabric can be obtained. Here, the term non-woven fabric includes not only a non-woven fabric in which the solvent in the solution has been already removed, but also a non-woven fabric containing the solvent of the solution.

In the case of the non-woven fabric containing the solvent, the solvent is removed after the electro-spinning. Examples of the method for removing the solvent include the method that the non-woven fabric is immersed in a poor solvent to extract the solvent and the method that the residual solvent is vaporized by a heat treatment.

A material of a solution vessel 3 is not particularly restricted as long as it has resistance to the organic solvent to be used. Also, the solution in the solution vessel 3 may be discharged in the electric field by a method of mechanically extraction, pumping out or the like.

The spinning nozzle 2 has preferably an inside diameter of from about 0.1 mm to about 3 mm. When the nozzle inside diameter is in this range, a non-woven fabric which has an average fiber diameter in the range of from 0.001 µm to 1 µm and is used in the separator for an electronic component of the present invention can be obtained. A material of the nozzle may be either a metal or a nonmetal. When the nozzle is made of a metal, the nozzle may be used as one electrode. When the nozzle 2 is made of a nonmetal, an electric field may be impressed on the discharged solution by installing the electrode inside of the nozzle. A plurality of nozzles may be used considering production efficiency. In addition, though the cross-section shape of the nozzle is generally circular, a nozzle having a modified cross-section shape may be used according to the kind of polymer and a use application.

With regard to the counter electrode 5, an electrode having various shapes such as a roll-like electrode as shown in FIG. 1, or plate-like or belt-like metallic electrode may be used according to a use application.

Though the case that the counter electrode 5 serves as the substrate to collect fibers is explained in the above description, a substance that serves as the collecting substrate may be installed between the spinning nozzle 2 and the counter electrode 5 to collect fibers thereon. In this case, for example, a belt substrate is installed between the spinning nozzle 2 and the counter electrode 5, thereby enabling continuous production.

Though the electrodes are generally formed in pairs, an additional electrode may be introduced. Fibers are spun by the pair of electrodes, and further, the introduced electrode of different electric potential is used to control the state of the electric field, thereby controlling the condition of the fiber spinning.

A high-voltage power supply 4 is not restricted particularly, and a direct-current high-voltage generator may be used and also a Van de Graaff electrostatic generator may be used. Though the applied voltage is not limited particularly, the voltage is generally in the range of from 3 kV to 100 kV, preferably in the range of from 5 kV to 50 kV and more preferably in the range of from 5 kV to 30 kV. The polarity of the applied voltage may be either positive or negative.

The distance between the electrodes is dependent on, for example, the applied voltage, the size of the nozzle, the discharging amount of the spinning solution, the solid concentration of the spinning solution, and the like. In producing the non-woven fabric used in the separator for an electronic component of the present invention, the distance between the electrodes is appropriately in the range of from 5 cm to 20 cm. When the distance between the electrodes is in this range, a non-woven fabric which has an average fiber diameter in the range of from 0.001 μm to 1 μm and is used in the separator for an electronic component of the present invention can be obtained.

With regard to an atmosphere of the fiber spinning, the fiber spinning is usually performed in air. However, the electro-spinning may be also performed in a gas, such as carbon dioxide, having a higher sparkover voltage than air, which enables spinning at a low voltage and also makes it possible to prevent abnormal electrical discharge such as a corona discharge. Also, in the case that water is a poor solvent which scarcely solve polymer, polymer may precipitates in the proximity of the spinning nozzle. In this case, it is preferable to perform fiber spinning in air which is allowed to pass through a drying unit to reduce water content in air.

Next, the step for obtaining the non-woven fabric used in the separator for an electronic component of the present invention is described. In the present invention, during drawing the polymer solution towards the counter electrode 5, a fibrous substance is formed by a solvent vaporization on a condition. This fibrous substance is collected on the collecting substrate which serves as the counter electrode 5 or the collecting substrate installed between the spinning nozzle 2 and the counter electrode 5. At usual room temperature, the solvent is vaporized completely before the fibrous substance is collected on the collecting substrate. In the case that the solvent is insufficiently vaporized, the fiber drawing may be performed under reduced pressure. The fiber used in the separator for an electronic component of the present invention has been formed by the time when the fibrous substance is collected on the collecting substrate at the latest. The fiber drawing temperature is usually at the range of from 0° C. to 50° C. though it depends on the state of the solvent vaporization and on the viscosity of the fiber spinning solution. Then, the fibers are accumulated on the collecting substrate to thereby produce the non-woven fabric used in the separator for an electronic component of the present invention.

The non-woven fabric used in the separator for an electronic component of the present invention is subjected to after-treatment so as to suit to each use application if necessary. For example, calendering treatment for densification or arranging the accuracy of the thickness, hydrophilic treatment, water-repellent treatment, treatment for sticking a surfactant, washing treatment using pure water, carbonizing treatment and activating treatment may be subjected.

The non-woven fabric used in the separator for an electronic component of the present invention may be used singly or in combination of other members according to handleability and a use application. For example, cloths (non-woven fabrics, woven fabrics and knit fabrics) that can be a support base material as the collecting substrate, metals having a film, drum, net, plate or belt form, conductive materials made of carbon or the like and nonconductive materials made of organic polymers may be used. By forming the non-woven fabric on these members, the member that the support base material is combined with the non-woven fabric can be manufactured.

In the case that the separator is used in batteries or capacitors, electro-spinning is preferably performed directly on the surface of electrodes (aluminum, carbon, tantalum, platinum and nickel) to be used.

The separator for an electronic component of the present invention preferably comprises a non-woven fabric composed of fibers having an average fiber diameter in the range of from 0.001 μm to 1 μm. This is because the separator for use in an electronic component in which the non-woven fabric is used has particularly preferable air permeability when the average fiber diameter is in this range. When the average fiber diameter is less than 0.001 μm, not only it is difficult to produce the non-woven fabric, but also the obtained non-woven fabric comes to have properties equivalent to a general film. When the average fiber diameter exceeds 1 μm, only the effect equivalent to a conventional non-woven fabric is obtained. The average fiber diameter is preferably in the range of from 0.01 μm to 0.9 μm and more preferably in the range of from 0.05 μm to 0.5 μm.

A polymer which is to be a main component of the non-woven fabric used in the separator for an electronic component of the present invention is not particularly restricted as long as it can be formed by the electro-spinning method. However, it is preferable to use a heat-resistant polymer to improve safety during reflow soldering or short-circuiting.

Examples of the heat-resistant polymers include polyimide, polyamide-imide, all aromatic polyamides, all aromatic polyesters, aromatic polyether amide, polyphenylene sulfide, polybenzimidazole and polybenzoxazole. Polyamide-imide which is highly soluble in solvents is particularly preferable to the electro-spinning.

Although polyamide-imide used in the separator for an electronic component of the present invention may be synthesized by a usual method such as an acid chloride method using trimellitic acid chloride and diamine or a diisocyanate method using trimellitic acid anhydride and diisocyanate, the diisocyanate method is preferably used in the aspect of production costs.

The structure of polyamide-imide used in the separator for an electronic component of the present invention preferably contains at least the structure represented by the formula (I) from the standpoint of polymerization property and solubility of the obtained polymer.

[Chemical formula 3]

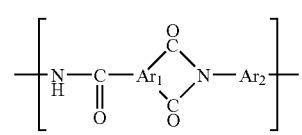

Formula (I)

Though an acid component, which is a precursor for the synthesis of polyamide-imide used in the separator for an electronic component of the present invention, is trimellitic acid anhydride or trimellitic acid chloride, a part of these acid components may be replaced with other polybasic acids or anhydrides thereof. Examples of these polybasic acids and anhydrides thereof include tetracarboxylic acids such as pyromellitic acid, biphenyltetracarboxylic acid, biphenylsulfone tetracarboxylic acid, benzophenone tetracarboxylic acid, biphenyl ether tetracarboxylic acid, ethylene glycol bistrimellitate and propylene glycol bistrimellitate, and anhydrides thereof; aliphatic dicarboxylic acids such as oxalic acid, adipic acid, malonic acid, sebacic acid, azelaic acid, dodecanedicarboxylic acid, dicarboxypolybutadiene, dicarboxypoly(acrylonitrile-butadiene) and dicarboxypoly(styrene-butadiene); alicyclic dicarboxylic acids such as 1,4-cyclohexanedicarboxylic acid, 1,3-cyclohexanedicarboxylic acid, 4,4'-dicyclohexylmethanedicarboxylic acid and dimer acid; and aromatic dicarboxylic acids such as terephthalic acid, isophthalic acid, diphenyl sulfonedicarboxylic acid, diphenyl ether dicarboxylic acid and naphthalenedicarboxylic acid.

Also, a part of the trimellitic acid compound may be replaced with glycols. Examples of the glycols include alkylene glycols such as ethylene glycol, propylene glycol, tetramethylene glycol, neopentyl glycol and hexane diol; polyalkylene glycols such as polyethylene glycol, polypropylene glycol and polytetramethylene glycol; and polyesters which have a terminal hydroxyl group and are synthesized from one or more of the dicarboxylic acids and one or more of the glycols.

Examples of diamine (diisocyanate) components which is a precursor for the synthesis of polyamide-imide used in the separator for an electronic component of the present invention include aliphatic diamines such as ethylenediamine, propylenediamine and hexamethylenediamine, and diisocyanates of these compounds; alicyclic diamines such as 1,4-cyclohexanediamine, 1,3-cyclohexanediamine, isophorone diamine and 4,4'-dicyclohexylmethanediamine, and diisocyanates of these compounds; aromatic diamines such as m-phenylenediamine, p-phenylenediamine, 4,4'-diaminodiphenylmethane, 4,4'-diaminodiphenyl ether, 4,4'-diaminodiphenylsulfone, benzidine, o-tolidine, 2,4-tolylenediamine, 2,6-tolylenediamine and xylylenediamine, and diisocyanates of these compounds, and the like. Among these compounds, 4,4'-diaminodiphenylmethane, o-tolidine and diisocyanates of these compounds are preferable in the aspect of reactivity and costs.

Examples of solvents used for the polymerization of polyimide-imide used in the separator for an electronic component of the present invention include organic amide polar solvents such as N,N'-dimethylformamide, N,N'-dimethylacetamide, N-methyl-2-pyrrolidone, γ-butyrolactone, N-methylcaprolactam; water-soluble ether compounds such as tetrahydrofuran and dioxane; water-soluble ketone compounds such as acetone and methyl ethyl ketone; water-soluble nitrile compounds such as acetonitrile and propionitrile, and the like. These solvents may be used as a mixture of two or more solvents, and are not restricted particularly.

Inherent viscosity of polyamide-imide used in the polyamide-imide fiber and the non-woven fabric of the present invention preferably exceeds 0.2 dl/g. Though the inherent viscosity is dependent on the molar ratio of the amount of the diamine (diisocyanate) component to the used amount of the acid component, time for the polymerization and polymerization temperature, it can exceed 0.2 dl/g by appropriately configuring these conditions. For example, in the case where the molar ratio of the used amount of the diamine (diisocyanate) component to the used amount of the acid component is from 0.90 to 1.20, the inherent viscosity can be made to exceed 0.2 dl/g by configuring the time for the polymerization to from 10 minutes to 30 hours and the polymerization temperature to the range of from 70° C. to 160° C. When the inherent viscosity is 0.2 dl/g or less, the mechanical strength of a nano-order fiber is insufficient and, it is difficult to form a continuous fiber by an electro-spinning method.

The polymerization of polyamide-imide used in the separator for an electronic component of the present invention may proceed easily by stirring while heating at the range of from 60° C. to 200° C. in the polar solvent under an inert gas atmosphere.

In producing polyamide-imide used in the separator for an electronic component of the present invention, amines such as triethylamine, diethylenetriamine and 1,8-diazabicyclo[5,4,0]-7-undecene (DBU) and alkali metal salts such as sodium fluoride, potassium fluoride, cesium fluoride and sodium methoxide may be used as a catalyst as need.

A solid concentration of a polyamide-imide solution is preferably in the range of from 0.1% by weight to 30% by weight, and more preferably in the range of from 1% by weight to 25% by weight.

In producing polyamide-imide used in the separator for an electronic component of the present invention, additives such as an inorganic or organic filler may be compounded to improve various properties of the non-woven fabric obtained by the fiber spinning. When the additive has low affinity to polyamide-imide, the size of the additive is preferably smaller than that of the polyamide-imide fiber to be obtained. If the size of the additive is larger, the additive precipitates during electro-spinning, which causes a thread breakage. Examples of the method for compounding the additive include the method that a necessary amount of the additive is added in advance in a reaction system of the polyamide-imide polymerization and the method that a necessary amount of the additive is added after the polyamide-imide polymerization reaction is completed. When the additive does not inhibit the polymerization, the former method is preferable because a non-woven fabric in which the additive is uniformly dispersed is obtained. In the case of the method that a necessary amount of the additive is added after the polyamide-imide polymerization reaction is completed, stirring by ultrasonic wave or a mechanical means such as a homogenizer is carried out.

The polyamide-imide non-woven fabric used in the separator for an electronic component of the present invention is formed of fibers having an average fiber diameter in the range of from 0.001 μm to 1 μm. When the average fiber diameter is less than 0.001 μm, it is unfavorable because of poor self-support property. When the average fiber diameter exceeds 1 μm, it is unfavorable because of less surface area of the non-woven fabric. The average fiber diameter is more preferably in the range of from 0.005 μm to 0.5 μm and particularly preferably in the range of from 0.01 μm to 0.2 μm.

Next, the process of the electro-spinning method for producing the polyamide-imide non-woven fabric used in the separator for an electronic component of the present invention is described in detail. First, a solution in which polyamide-imide is dissolved in an organic solvent is produced. A solid concentration of polyamide-imide in the solution used in the process for producing the polyamide-imide non-woven fabric used in the separator for an electronic component of the present invention is preferably in the range of from 0.1% by weight to 30% by weight. When the solid concentration of polyamide-imide is less than 0.1% by weight, it is unfavorable because the concentration is so low that it is difficult to form the polyimide-imide non-woven fabric. When the solid concentration exceeds 30% by weight, it is unfavorable because the fiber diameters of the obtained polyamide-imide non-woven fabric are increased. The solid concentration of polyamide-imide is more preferably in the range of from 1% by weight to 20% by weight.

The organic solvent to form the polyamide-imide solution used in the polyamide-imide non-woven fabric, which is used in the separator for an electronic component of the present invention, is not particularly restricted as long as it can dissolve polyamide-imide in the range of the above concentration. In fiber spinning, a polymerization solution obtained by preparing polyamide-imide may be used as it is, or a solution which is obtained by precipitating polyamide-imide by using a poor solvent, washing and purifying the polyamide-imide precipitate, and then resolving the washed and purified precipitate in a good solvent may be used. In the case that the obtained polyamide-imide fiber is not impaired, it is preferable to use the polymerization solvent as it is.

Examples of the solvent to form the polyamide-imide solution used in the polyamide-imide non-woven fabric, which is used in the separator for an electronic component of the present invention, include highly volatile solvents such as acetone, chloroform, ethanol, isopropanol, methanol, toluene, tetrahydrofuran, benzene, benzyl alcohol, 1,4-dioxane, propanol, carbon tetrachloride, cyclohexane, cyclohexanone, methylene chloride, phenol, pyridine, trichloroethane and acetic acid; and relatively less volatile solvents such as N,N-dimethylformamide (DMF), dimethylsulfoxide (DMSO), N,N-dimethylacetamide (DMAc), 1-methyl-2-pyrrolidone (NMP), ethylene carbonate, propylene carbonate, dimethyl carbonate, acetonitrile, N-methylmorpholine-N-oxide, butylene carbonate, γ-butyrolactone, diethyl carbonate, diethyl ether, 1,2-dimethoxyethane, 1,3-dimethyl-2-imidazolidinone, 1,3-dioxolan, ethylmethyl carbonate, methyl formate, 3-methyloxazolidin-2-one, methyl propionate, 2-methyltetrahydrofuran and sulfolane. Alternatively, the mixture of two or more of the above solvents may also be used.

Though the areal weight of the non-woven fabric used in the separator for an electronic component of the present invention is determined according to its use application and is not limited particularly, it is preferably in the range of from 1 g/m$^2$ to 50 g/m$^2$ in an air filter application. The areal weight is measured according to JIS-L1085.

Though the thickness of the non-woven fabric used in the separator for an electronic component of the present invention is determined according to its use application and is not limited particularly, it is preferably in the range of from 1 μm to 100 μm. The thickness is measured by a micrometer.

The air permeability of the separator for an electronic component of the present invention is preferably in the range of from 1 sec/100 cc Air to 2000 sec/100 cc Air. When the air permeability is 1 sec/100 cc Air or less, the strength of a membrane may be weakened, whereas when the air permeability exceeds 2000 sec/100 cc Air, the electroconductivity may be impaired. The air permeability is measured according to JIS-P8117. The air permeability of the separator is dependent on the areal weight and the thickness of the non-woven fabric. When the areal weight of the non-woven fabric is in the range of from 1 g/m$^2$ to 50 g/m$^2$ and the thickness of the non-woven fabric is in the range of from 1 μm to 100 μm, the air permeability may become in the range of from 1 sec/100 cc Air to 2000 sec/100 cc Air.

EXAMPLES

The present invention is hereinafter described in more detail by way of Examples. However, the present invention is not limited to these Examples. Evaluation items in each Example described below were measured using the following methods.

(Inherent Viscosity)

A solution obtained by dissolving 0.5 g of polyamide-imide in 100 ml of N-methyl-2-pyrrolidone was kept at 30° C. to be measured the viscosity using an Ubbelohde viscometer.

(Average Fiber Diameter)

A scanning electronic microphotograph (magnification: 5000 times) of the surface of the obtained non-woven fabric was taken. The diameter of the fiber was measured from the photograph, and the number average value of 5 to 10 samples was calculated.

(Glass Transition Temperature)

A polyamide-imide film of 4-mm-wide and 15-mm-long was vibrated in a frequency of 110 Hz using a DVE-V4 Rheospectrer manufactured by Rheology Company to be measured the loss elastic modulus of dynamic viscoelasticity. The inflection point of the loss elastic modulus was defined as the glass transition temperature. The measurement was conducted at the temperature rising rate of 4° C./min and in the measuring temperature range of from room temperature to 400° C.

<Polymerization of Polyamide-Imide>

Polymerization Example 1

Into a four-neck flask equipped with a thermometer, a condenser tube and a nitrogen gas introduction tube, 1 mol of trimellitic acid anhydride (TMA), 0.995 mol of diphenylmethanediisocyanate (MDI) and 0.01 mol of potassium fluoride were fed with N,N-dimethylacetamide so that the solid concentration was 25%. The mixture was heated to 90° C. and stirred for about 3 hours to synthesize polyamide-imide. The obtained polyamide-imide had inherent viscosity of 0.86 dl/g and a glass transition temperature of 290° C.

Polymerization Example 2

Polyamide-imide was synthesized in the same manner as in Example 1 except that potassium fluoride used in Example 1 was altered to 1,8-diazabicyclo[5,4,0]-7-undecene (DBU). The obtained polyamide-imide had inherent viscosity of 0.80 dl/g and a glass transition temperature of 290° C.

Polymerization Example 3

Into a four-neck flask equipped with a thermometer, a condenser tube and a nitrogen gas introduction tube, 1 mol of trimellitic acid anhydride (TMA), 1 mol of diphenylmethane-diisocyanate (MDI) and 0.02 mol of 1,8-diazabicyclo[5,4,0]-7-undecene (DBU) were fed with N-methyl-2-pyrrolidone (NMP) so that the solid concentration was 15%. The mixture was heated to 90° C. and stirred for about 3 hours under a nitrogen stream and then heated to 120° C. and stirred for an hour to synthesize polyamide-imide. The obtained polyamide-imide had inherent viscosity of 1.38 dl/g and a glass transition temperature of 290° C.

Polymerization Example 4

Polyamide-imide was synthesized in the same condition as in Example 1 except that the amount of TMA was altered to 1.03 mol. The obtained polyamide-imide had inherent viscosity of 0.45 dl/g and a glass transition temperature of 285° C.

Polymerization Example 5

Into a four-neck flask equipped with a thermometer, a condenser tube and a nitrogen gas introduction tube, 1 mol of trimellitic acid anhydride (TMA), 0.8 mol of o-tolidinediisocyanate (TODI), 0.2 mol of 2,4-tolylenediisocyanate (TDI) and 0.01 mol of potassium fluoride were fed with N-methyl-2-pyrrolidone so that the solid concentration was 20%. The mixture was stirred at 100° C. for about 5 hours and then diluted with N-methyl-2-pyrrolidone so that the solid concentration was 10% to synthesize polyamide-imide. The obtained polyamide-imide had inherent viscosity of 1.35 dl/g and a glass transition temperature of 310° C.

Polymerization Example 6

Into a four-neck flask equipped with a thermometer, a condenser tube and a nitrogen gas introduction tube, 0.8 mol of trimellitic acid anhydride (TMA), 0.125 mol of benzophenonetetracarboxylic acid dianhydride (BTDA), 0.075 mol of bisphenyltetracarboxylic acid dianhydride (BPDA), 1.0 mol of o-tolidinediisocyanate (TODI) and 0.02 mol of 1,8-diazabicyclo[5,4,0]-7-undecene (DBU) were fed with N-methyl-2-pyrrolidone (NMP) so that the solid concentration was 13%. The mixture was heated to 90° C. and stirred for about 5 hours under a nitrogen stream to synthesize polyamide-imide. The obtained polyamide-imide had inherent viscosity of 1.50 dl/g and a glass transition temperature of 340° C.

Polymerization Example 7

Into a four-neck flask equipped with a thermometer, a condenser tube and a nitrogen gas introduction tube, 0.8 mol of trimellitic acid anhydride (TMA), 0.2 mol of dimer acid, 1.0 mol of o-tolidinediisocyanate (TODI) and 0.02 mol of 1,8-diazabicyclo[5,4,0]-7-undecene (DBU) were fed with N-methyl-2-pyrrolidone (NMP) so that the solid concentration was 15%. The mixture was heated to 90° C. and stirred for about 3 hours under a nitrogen stream and then heated to 120° C. and stirred for about an hour to synthesize polyamide-imide. Then, the obtained polyimide-imide had inherent viscosity of 1.40 dl/g and a glass transition temperature of 250° C.

Polymerization Example 8

Into a four-neck flask equipped with a thermometer, a condenser tube and a nitrogen gas introduction tube, 0.8 mol of ethylene glycol bis(trimellitate) dianhydride (TMEG), 0.2 mol of isophthalic acid, 1.0 mol of o-tolidinediisocyanate (TODD) and 0.02 mol of 1,8-diazabicyclo[5,4,0]-7-undecene (DBU) were fed with N-methyl-2-pyrrolidone (NMP) so that the solid concentration was 20%. The mixture was heated to 90° C. and stirred for about 3 hours under a nitrogen stream and heated to 120° C. for about an hour. The reaction mixture was diluted with N-methyl-2-pyrrolidone so that the solid concentration was 15% to synthesize polyamide-imide. The obtained polyamide-imide had inherent viscosity of 0.99 dl/g and a glass transition temperature of 235° C.

Polymerization Example 9

Into a four-neck flask equipped with a thermometer, a condenser tube and a nitrogen gas introduction tube, 1 mol of trimellitic acid anhydride, 0.99 mol of naphthalenediisocyanate and 0.02 mol of potassium fluoride were fed with N-methyl-2-pyrrolidone (NMP) so that the solid concentration was 20%. The mixture was heated to 120° C., stirred for about 5 hours and diluted with N-methyl-2-pyrrolidone so that the solid concentration was 15% to synthesize polyamide-imide. The obtained polyamide-imide had inherent viscosity of 1.12 dl/g and a glass transition temperature of 350° C.

Polymerization Example 10

Polyamide-imide was synthesized in the same condition as in Example 1 except that the amount of TMA was altered to 1.1 mol. The obtained polyamide-imide had inherent viscosity of 0.20 dl/g and a glass transition temperature of 285° C.

<Production of a Polyamide-Imide Fiber and a Polyamide-Imide Non-Woven fabric>

A polyamide-imide solution shown in Polymerization Examples was poured into a large amount of water to precipitate polyamide-imide, which was then collected. After dried under heating, the polyamide-imide was redissolved in the solvent shown in Tables 1 to 3 to obtain a polyimide-imide solution having a predetermined concentration. Using the equipment shown in FIG. 1, the solution was discharged towards the counter electrode 5 to collect polyamide-imide fibers on a collecting substrate which serves as the counter electrode 5, and then the fibers were accumulated to produce a polyamide-imide non-woven fabric. A 18G (inside diameter: 0.8 mm) needle was used as the spinning nozzle 2 and the distance between the spinning nozzle 2 and the counter electrode 5 was 10 cm. The condition of the discharged amount of the spinning solution and the applied voltage and the average fiber diameter of the obtained fibers are shown in Tables 1 to 3.

TABLE 1

| | Example 1 | Example 2 | Example 3 | Example 4 | Example 5 | Example 6 |
|---|---|---|---|---|---|---|
| Polymerization Example | 1 | 1 | 1 | 1 | 1 | 2 |
| Solvent | DMAc | DMAc | DMAc | DMAc | DMAc | DMAc |
| Solid concentration (% by weight) | 20 | 20 | 15 | 10 | 3 | 20 |
| Discharged amount (mg/min) | 145 | 14 | 14 | 145 | 145 | 145 |
| Applied voltage (kV) | 18 | 13 | 13 | 13 | 10 | 18 |
| Average fiber diameter (μm) | 0.90 | 0.37 | 0.18 | 0.26 | 0.10 | 0.85 |

TABLE 2

|  | Example 7 | Example 8 | Example 9 | Example 10 | Example 11 | Example 12 |
|---|---|---|---|---|---|---|
| Polymerization Example | 3 | 3 | 3 | 4 | 5 | 6 |
| Solvent | DMAc | DMAc | DMAc | DMAc | DMAc | NMP |
| Solid concentration (% by weight) | 12 | 8 | 7 | 10 | 10 | 8 |
| Discharged amount (mg/min) | 14 | 14 | 14 | 14 | 145 | 14 |
| Applied voltage (kV) | 13 | 14 | 14 | 12 | 20 | 15 |
| Average fiber diameter (μm) | 0.30 | 0.10 | 0.08 | 0.16 | 0.80 | 0.40 |

TABLE 3

|  | Example 13 | Example 14 | Example 15 | Comparative Example 1 | Comparative Example 2 | Comparative Example 3 |
|---|---|---|---|---|---|---|
| Polymerization Example | 7 | 8 | 9 | 10 | 10 | 10 |
| Solvent | NMP | NMP | DMAc | DMAc | DMAc | DMAc |
| Solid concentration (% by weight) | 15 | 15 | 15 | 20 | 20 | 15 |
| Discharged amount (mg/min) | 14 | 14 | 14 | 145 | 14 | 14 |
| Applied voltage (kV) | 15 | 12 | 20 | 18 | 13 | 13 |
| Average fiber diameter (μm) | 0.75 | 0.26 | 0.50 | No fiber is obtained | No fiber is obtained | No fiber is obtained |

<Measurement of Air Permeability>

Example 16

N,N-dimethylacetamide was added to the polyamide-imide solution obtained in Polymerization Example 1 so that the solid concentration was 20%. This polyamide-imide solution was discharged towards the counter electrode 5 which serves as the collecting substrate for 5 minutes by using the equipment shown in FIG. 1 to obtain a polyimide-imide non-woven fabric. A 18G (inside diameter: 0.8 mm) needle was used as the spinning nozzle 2, the voltage was 18 kV and the distance between the spinning nozzle 2 and the counter electrode 5 was 10 cm. The fiber spinning was performed at room temperature under normal pressure in air, and the solvent had been vaporized from the fibers when the fibers were collected. A non-woven fabric having an average fiber diameter of 0.90 μm and a thickness of 26 μm was obtained. The air permeability of the non-woven fabric was 20 sec/100 cc Air.

Example 17

Charging-spinning was performed in the same manner as in Example 16 except that the polyimide-imide solution in Example 16 was diluted with N,N-dimethylacetamide so that the solid concentration was 10%, the voltage was altered to 13 kV and the collecting time was altered to 10 minutes. The fiber spinning was performed at room temperature under normal pressure in air, and the solvent had been vaporized from the fibers when the fibers were collected. A non-woven fabric having an average fiber diameter of 0.26 μm and a thickness of 21 μm was obtained. The air permeability of the non-woven fabric was 160 sec/100 cc Air.

Example 18

Charging-spinning was performed in the same manner as in Example 16 except that the polyamide-imide solution in Example 16 was diluted with N,N-dimethylacetamide so that the solid concentration was 3%, the voltage was altered to 10 kV and the collecting time was altered to 40 minutes. The fiber spinning was performed at room temperature under normal pressure in air, and the solvent had been vaporized from the fibers when the fibers were collected. A non-woven fabric having an average fiber diameter of 0.10 μm and a thickness of 20 μm was obtained. The air permeability of the non-woven fabric was 120 sec/100 cc Air.

Example 19

Charging-spinning was performed in the same manner as in Example 16 except that the polyamide-imide solution obtained in the Polymerization Example 4 was diluted with N,N-dimethylacetamide so that the solid concentration was 10%, the voltage was altered to 12 kV and the collecting time was altered to 10 minutes. The fiber spinning was performed at room temperature under normal pressure in air, and the solvent had been vaporized from the fibers when the fibers were collected. A non-woven fabric having an average fiber diameter of 0.16 μm and a thickness of 18 μm was obtained. The air permeability of the non-woven fabric was 90 sec/100 cc Air.

Example 20

The polyamide-imide solution obtained in Polymerization Example 5 was discharged towards the counter electrode 5 which serves as the collecting substrate for 5 minutes by using the equipment shown in FIG. 1 to obtain a polyamide-imide non-woven fabric. A 18G (inside diameter: 0.8 mm) needle was used as the spinning nozzle 2, the voltage was 20 kV and the distance between the spinning nozzle 2 and the counter electrode 5 was 15 cm. The fiber spinning was performed at room temperature under normal pressure in air, and the solvent had been vaporized from the fibers when the fibers were collected. A non-woven fabric having an average fiber diameter of 0.80 μm and a thickness of 29 μm was obtained. The air permeability of the non-woven fabric was 25 sec/100 cc Air.

As is clear from the above Examples, the separator for an electronic component of the present invention has a high glass transition temperature and is superior in safety during reflow soldering or short-circuiting. Further, the separator has a large air permeability and is superior in the prevention of short circuit though it has a small thickness, and therefore it is very useful as separators for use in an electronic component.

INDUSTRIAL APPLICABILITY

According to the polyamide-imide fiber of the present invention, a nano-order fiber which is well-balanced between strength and heat resistance is obtained at low costs. Therefore, a polyimide non-woven fabric produced from the polyamide-imide fiber can be utilized in the wide variety fields of applications such as low pressure-loss filters and substitutions of membranes. In addition, the separator for an electronic component of the present invention has a high conductivity and a small separator thickness, and is improved in safety during reflow soldering or short-circuiting, and therefore, it greatly contributes to the industry.

What is claimed is:

1. A non-woven fabric, comprising a polyamide-imide fiber having an average fiber diameter in the range of from 0.001 μm to 1 μm,
wherein the-polyamide-imide fiber comprises a polyamide-imide containing a

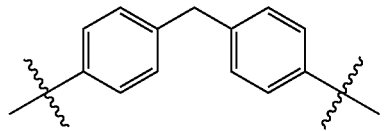 [SMILES: *c1ccc(Cc2ccc(*)cc2)cc1]

moiety or a

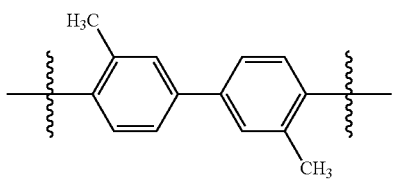 [SMILES: *c1ccc(-c2ccc(*)c(C)c2)cc1C]

moiety,
the polyamide-imide is obtained by using a catalyst selected from the group consisting of triethylamine, diethylenetriamine, 1,8-diazabicyclo[5,4,0]-7-undecene, sodium fluoride, potassium fluoride, cesium fluoride, and sodium methoxide,
and the polyamide-imide has inherent viscosity of 0.86 dL/g or more.

2. The non-woven fabric of claim 1, wherein the polyamide-imide is of formula (I):

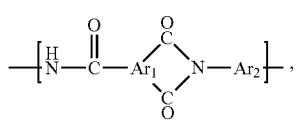

in which $Ar_1$ is a trivalent residue and $Ar_2$ is

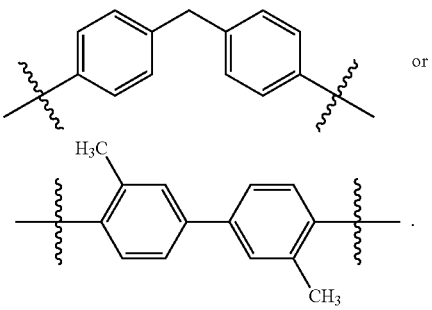

3. The non-woven fabric of claim 2, wherein $Ar_1$ is

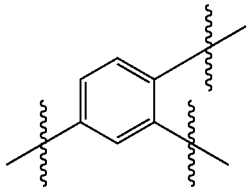

4. The non-woven fabric of claim 1, wherein the polyamide-imide fiber comprises a polyamide-imide containing a

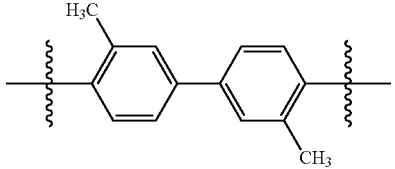 [SMILES: *c1ccc(-c2ccc(*)c(C)c2)cc1C]

moiety.

5. The non-woven fabric of claim 1, wherein the polyamide-imide has a glass transition temperature of at least 235° C.

6. A process for producing the non-woven fabric of claim 1, comprising:
preparing a solution containing the polyamide-imide and an organic solvent, spinning a fiber from the obtained solution by an electro-spinning method, and collecting the fiber containing the polyamide-imide on a collecting substrate.

7. A separator for use in an electronic component, the separator comprising a non-woven fabric produced by the method of claim 6.

8. The separator of claim 7, wherein the electronic component is a battery or a capacitor.

9. A separator for use in an electronic component, the separator comprising the non-woven fabric of claim 1.

10. The separator for use in an electronic component according to claim 9, wherein air permeability of the separator is in the range of from 1 sec/100 cc Air to 2000 sec/100 cc Air.

11. The separator for use in an electronic component according to claim 9, wherein the fiber contains the polyamide-imide as a main component.

12. The separator for use in an electronic component according to claim 11, wherein the polyamide-imide has inherent viscosity of 0.2 dL/g or more.

13. The separator according to claim 12, wherein the electronic component is a battery or a capacitor.

14. The separator according to claim 11, wherein the electronic component is a battery or a capacitor.

15. The separator of claim 9, wherein the electronic component is a battery or a capacitor.

16. The separator of claim 10, wherein the electronic component is a battery or a capacitor.

17. A non-woven fabric, comprising a polyamide-imide fiber having an average fiber diameter in the range of from 0.001 μm to 1 μm,
wherein the polyamide-imide fiber comprises a polyamide-imide containing a

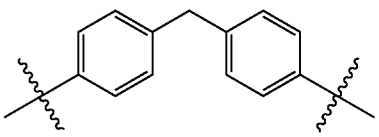 [SMILES: *c1ccc(Cc2ccc(*)cc2)cc1]

moity or a

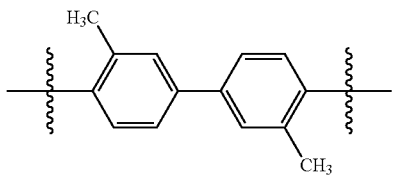 [SMILES: *c1ccc(-c2ccc(*)c(C)c2)cc1C]

moiety, and the polyamide-imide is obtained from reacting an acid component with an amine component or a diisocyanate component, the amine component comprises 4,4'-diaminodiphenylmethane or o-tolidine, the diisocyanate component comprises 4,4'-diphenylmethanediisocyanate or o-tolidinediisocyanate,
the polyamide-imide is obtained by using a catalyst selected from the group consisting of triethylamine, diethylenetriamine, 1,8-diazabicyclo[5,4,0]-7-undecene, sodium fluoride, potassium fluoride, cesium fluoride, and sodium methoxide,
and the polyamide-imide has inherent viscosity of 0.86 dL/g or more.

18. A process for producing the non-woven fabric of claim 17, comprising:
preparing a solution containing the polyamide-imide and an organic solvent, spinning a fiber from the obtained solution by an electro-spinning method, and collecting the fiber containing the polyamide-imide on a collecting substrate.

19. A separator for use in an electronic component, the separator comprising the non-woven fabric of claim 17.

20. The separator of claim 19, wherein the electronic component is a battery or a capacitor.

21. The non-woven fabric of claim 17, wherein the polyamide-imide is of formula (I):

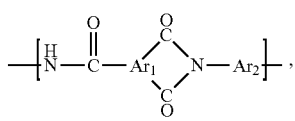

in which $Ar_1$ is a trivalent residue and $Ar_2$ is

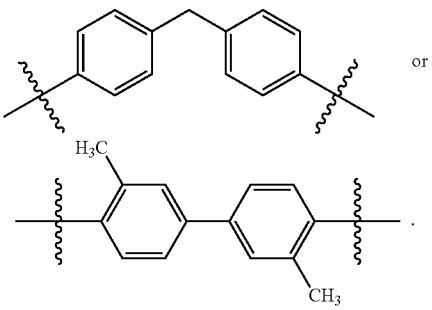

22. The non-woven fabric of claim 21, wherein $Ar_1$ is

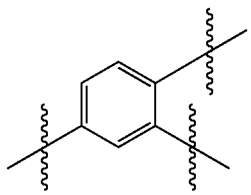

23. The non-woven fabric Of Claim 17, wherein the polyamide-imide fiber comprises a polyamide-imide containing a

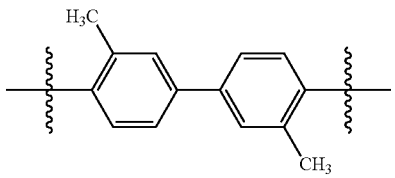

moiety.

24. The non-woven fabric of claim 17, wherein the polyamide-imide has a glass transition temperature of at least 235° C.

25. A polyamide-imide fiber having an average fiber diameter in the range of from 0.001 μm to 1 μm,
wherein the polyamide-imide fiber comprises a polyamide-imide containing a

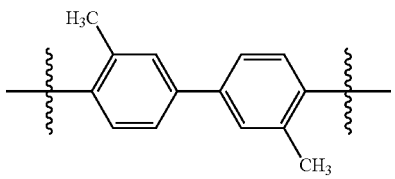 [SMILES: *c1ccc(-c2ccc(*)c(C)c2)cc1C]

moiety,
the polyamide-imide is obtained by using a catalyst selected from the group consisting of triethylamine, diethylenetriamine, 1,8-diazabicyclo[5,4,0]-7-undecene, sodium fluoride, potassium fluoride, cesium fluoride, and sodium methoxide,
and the polyamide-imide has inherent viscosity of 0.86 dL/g or more.

26. The polyamide-imide fiber of claim 25, wherein the polyamide-imide is of formula (I):

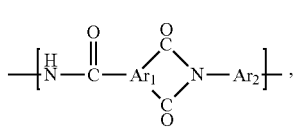   (I)

in which $Ar_1$ is a trivalent residue and $Ar_2$ is

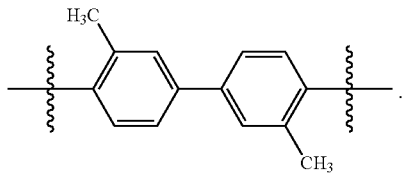.

27. The polyamide-imide fiber of claim 26, wherein $Ar_1$ is

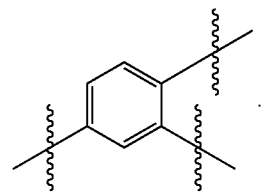 [SMILES: *c1ccc(*)c(*)c1]

28. The polyamide-imide fiber of claim 25, wherein the polyamide-imide has a glass transition temperature of at least 235° C.

29. The polyamide-imide fiber of claim 25, wherein the polyamide-imide is obtained from reacting an acid component with an amine component or a diisocyanate component, the amine component comprises o-tolidine, and the diisocyanate component comprises o-tolidinediisocyanate.

30. The polyamide-imide fiber of claim 29, wherein the polyamide-imide is of formula (I):

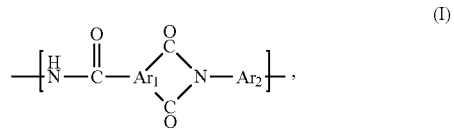   (I)

in which $Ar_1$ is a trivalent residue and $Ar_2$ is

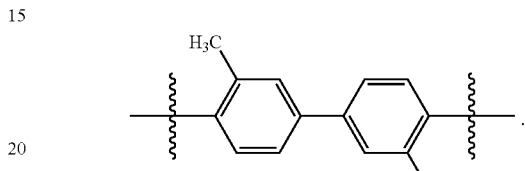.

31. The polyamide-imide fiber of claim 30, wherein $Ar_1$ is

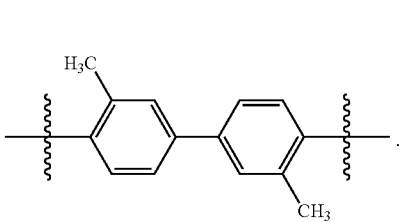

32. The polyamide-imide fiber of claim 29, wherein the polyamide-imide has a glass transition temperature of at least 235° C.

* * * * *